United States Patent
Saito

(10) Patent No.: US 7,267,767 B2
(45) Date of Patent: Sep. 11, 2007

(54) FILTRATION APPARATUS

(75) Inventor: Yasuhiro Saito, Kanagawa (JP)

(73) Assignee: Nihon Genryo Co., Ltd. (JP)

( * ) Notice: Subject to any disclaimer, the term of this patent is extended or adjusted under 35 U.S.C. 154(b) by 336 days.

(21) Appl. No.: 10/495,917

(22) PCT Filed: Nov. 18, 2002

(86) PCT No.: PCT/JP02/11991

§ 371 (c)(1),
(2), (4) Date: May 18, 2004

(87) PCT Pub. No.: WO03/043715

PCT Pub. Date: May 30, 2003

(65) Prior Publication Data

US 2004/0262211 A1    Dec. 30, 2004

(30) Foreign Application Priority Data

| Nov. 19, 2001 | (JP) | 2001-352583 |
| Jul. 29, 2002 | (JP) | 2002-219837 |
| Sep. 18, 2002 | (JP) | 2002-271452 |

(51) Int. Cl.
 *B01D 24/46* (2006.01)
(52) U.S. Cl. ............ 210/232; 210/269; 210/276; 210/280
(58) Field of Classification Search ............ 210/232, 210/269, 276, 280, 769
See application file for complete search history.

(56) References Cited

U.S. PATENT DOCUMENTS

| 3,747,768 A | * | 7/1973 | Barrera | 210/288 |
| 4,787,987 A | * | 11/1988 | Hensley | 210/792 |
| 6,273,106 B1 | * | 8/2001 | Saitoh | 134/65 |
| 2001/0018921 A1 | | 9/2001 | Saitoh | |

FOREIGN PATENT DOCUMENTS

| JP | 31491 | 9/1917 |
| JP | 63-98704 | 6/1988 |
| JP | 8-215509 A | 8/1996 |
| JP | 8-215510 A | 8/1996 |
| JP | 10-109051 | 4/1998 |
| JP | 11-057526 | 3/1999 |
| WO | WO 01/83076 | * 11/2001 |

OTHER PUBLICATIONS

International Search Report for PCT/JP02/11991 dated Feb. 25, 2003.
International Preliminary Examination Report for PCT/JP02/11991 dated Jun. 30, 2003.

* cited by examiner

*Primary Examiner*—Matthew O. Savage
(74) *Attorney, Agent, or Firm*—Finnegan, Henderson, Farabow, Garrett & Dunner, L.L.P.

(57) ABSTRACT

A cleansing tank 38 and a screw conveyor 32 are removably mounted to a mounting opening 22 of a filtration tank 2. When the cleansing tank 38 and the screw conveyor 32 are to be removed, they can be extracted to the exterior of the filtration tank 2, by detaching a base 28, which axially supports the screw conveyor 32, from a rim 24. Purified water is backwashed through a purified water discharge pipe 60 when the cleansing tank 38 and the screw conveyor 32 are extracted and inserted through the mounting opening 22. This causes filtration media 14 to float, thereby reducing the resistance thereof.

17 Claims, 11 Drawing Sheets

FILTRATION APPARATUS

TECHNICAL FIELD OF THE INVENTION

The present invention relates to a filtration apparatus for filtering liquids such as water. Particularly, the present invention relates to a filtration apparatus, to the interior of which a filtration media cleansing mechanism is mountable.

BACKGROUND ART

Conventionally, at large scale water treatment facilities such as water purification plants, water purification processes are performed by: removing fine suspended matter by filtering water through a layer of filtration media such as filtration sand; then by disinfecting the filtered water with chlorine. As cleansing methods of the filtration media, surface cleansing, which washes the surface of a sand layer by hitting it with water sprayed from a nozzle, and backwash cleansing, which forces purified water into a filtration reservoir from a lower pressure compartment, thereby floating the filtration sand grains, causing them to rub against each other, are in common use. However, if the backwash cleansing is repeated over a long period of time, the water pressure thereof influences even a gravel layer, creating areas of different thickness in said layer, which is optimally flat and of an even thickness. In addition, the surface cleansing and backwash cleansing methods cannot cleanse the filtration media with satisfactory efficacy. Problems arise from repeated use over a period of time such as contaminant accumulation on the filtration media. In this case, it is necessary to perform a regeneration process, which involves: totally ceasing the operation of the filtration reservoir, removing the filtration media, cleansing the filtration media, and replacing the contaminated filtration media, which has been cleansed. However, the regeneration process is extremely costly, and as during said process the filtration reservoir is not operating, it leads to a decrease in water treatment efficiency.

The applicant of the present invention, in order to meet this demand, has developed and proposed a sand cleansing apparatus which cleanses polluted filtration media in a shorter time and with a higher degree of cleansing ability (Japanese Unexamined Patent Publication Nos. 10(1998)-109051 and 11 (1999)-057526). This sand cleansing apparatus comprises: a sand receiving opening for receiving filtration media drawn from a filtration reservoir in its upper portion; a cleansing tank which stores sand and cleansing water having a sand extraction opening; a agitation tank erected within said cleansing tank having openings on the upper and lower ends thereof; and a screw conveyor which rotates within said agitation tank. The grains of sand are brought upward by the screw conveyor along with the cleansing water. As they are being conveyed upward, said grains of sand rub against each other by being agitated, and the scrubbing action thereof effectively removes the contaminants that are attached or coated thereon.

Filtration apparatuses, such as filtration tanks, which are installed in small scale simple plumbing networks or factories, differ from the large scale water purification plant described above. It is not practical to employ the sand cleansing apparatuses proposed by the present applicants (Japanese Unexamined Patent Publication Nos. 10(1998)-109051 and 11(1999)-057526) in these filtration apparatuses. This is because the utilization scales of the filtration apparatuses are small. Therefore, it is not efficient to secure space to install the sand cleansing apparatus in, and to expend costs associated with the installation and removal of the sand cleansing apparatus, when compared to the case of the filtration reservoir.

There are known filtration devices, as disclosed in Japanese Patent No. 31491 and Japanese Unexamined Utility Model Publication No. 63(1988)-98704, which have been developed in view of these points. The filtration device disclosed in Japanese Patent No. 31491 comprises a central pipe (cleansing tank), which is suspended by a frame (support portion). The lower end of the central pipe opens within a filtration chamber (filtration tank). A propeller is provided within the interior of the central pipe, at its lower end. A pipe having a jet expulsion opening is provided above the propeller, the jet expulsion opening being slightly above the upper edge of the central pipe. The pipe having the jet expulsion opening is linked to the propeller, and rotates therewith, to spray cleansing fluid in the horizontal direction by use of centrifugal force. During filtration, water having contaminants is supplied from above, and is filtered by passing through filtration sand, which is provided on an apertured false bottom (filtration floor). During cleansing, the propeller is rotated, causing filtration sand to be suctioned into the central pipe via the lower opening thereof. The filtration sand is elevated through the central pipe, then discharged in the horizontal direction by the cleansing fluid being sprayed from the jet expulsion opening. The filtration sand is cleansed by contaminants being separated therefrom at this time.

The filtration device disclosed in Japanese Unexamined Utility Model Publication No. 63-98704 comprises an elevating pipe (cleansing tank) erected therein, and a spiral water elevator provided within the elevating pipe. During filtration, water is discharged by a water dispersing tube, which is within filtration sand. Processed water, which has been filtered by passing through the filtration sand from below, is discharged above the filtration sand. During cleansing of the filtration sand, the spiral water elevator rotates and elevates the filtration sand, which has trapped contaminants, from the lower portion of the spiral water elevator. The contaminants are separated from the filtration sand by use of centrifugal force. The filtration sand is expelled through a filtration sand expulsion opening, which is provided in the upper portion of the elevating pipe.

Wear of the aforementioned propeller, central pipe, spiral water elevator and the elevating pipe is unavoidable over long term use, due to the relative movement among them and the filtration sand. Accordingly, the frequency of part replacement in the aforementioned devices is high.

In the filtration device disclosed in Japanese Patent No. 31491, the frame, to which the central pipe (cleansing tank) for cleansing the filtration media and the propeller is mounted, is suspended from a conduit pipe, which is provided at the upper portion of the filtration tank. However, the central pipe has a diameter far greater than the frame, and it cannot be dismounted from the conduit pipe to the exterior of the filtration tank. Accordingly, when the propeller or the central pipe become worn by the filtration media, it becomes necessary to disassemble the filtration tank to remove the propeller and the cleansing tank. In addition, filtration cannot be sustained, because agitation of the filtration media by the propeller crushes the filtration media (the properties of the filtration sand are changed).

In the filtration device disclosed in Japanese Unexamined Utility Model Publication No. 63-98704, the spiral water elevator is provided in an elevating pipe, which is formed integrally with a expulsion spout, through which filtered water is expelled. However, the elevating pipe is not configured to be removable from within a tank (filtration tank) In addition, the spiral water elevator is axially supported by small openings above and below it, and is also of a configuration that does not enable removal from within the tank. For these reasons, it is extremely difficult to exchange the elevating pipe and the spiral water elevator.

SUMMARY OF THE INVENTION

The present invention has been developed in view of the points described above. It is an object of the present invention to provide a filtration apparatus, in which a cleansing tank and a screw conveyor are easily replaced, thereby facilitating maintenance thereof.

It is a further object of the present invention to provide a low cost filtration apparatus, in view of the fact that filtration apparatuses having cleansing mechanisms built in are expensive.

The filtration apparatus of the present invention is a filtration apparatus for filtering liquid, which is introduced into a filtration tank, and discharging filtered liquid to the exterior of the filtration tank, comprising:

the filtration tank that houses filtration media; and
a filtration media cleansing mechanism that comprises a hollow cleansing tank for cleansing the filtration media; and a contaminant expulsion means for expelling contaminants separated from the filtration media to the exterior to the filtration tank; wherein:
the cleansing tank is a cylindrical body that hangs within the filtration tank from the upper portion thereof;
the cleansing tank is provided with a lower opening at a position lower than the upper surface of the filtration media housed in the filtration tank, and a plurality of upper openings at a position higher than the upper surface of the filtration media;
the cleansing tank is provided with a screw conveyor for conveying the filtration media and the liquid, which enter the cleansing tank from the filtration tank via the lower opening, upward from the lower opening to the upper openings while scrubbing the filtration media within the cleansing tank;
a mounting opening, to which the upper portion of the cleansing tank is removably attachable, is provided at the upper portion of the filtration tank; and
a cleansing portion, comprising the cleansing tank, the screw conveyor, and a drive mechanism for the screw conveyor, is removably attachable to the filtration tank via the mounting opening, from the exterior of the filtration tank.

It is preferable that the cleansing portion is configured so that the lower end of the screw conveyor protrudes downward from the lower opening of the cleansing tank.

A configuration may be adopted, wherein:
the cleansing portion is constructed by a plurality of arts, which are detachably linked so as to separate in the axial direction of the screw conveyor.

A configuration may also be adopted, wherein:
slots that enable the filtration media to pass therethrough are formed at the lower portion of the cleansing tank so that at least a portion of the slots are below the upper surface of the filtration media.

A configuration may further be adopted, wherein:
a plurality of gaps that extend along the outer periphery of the axis of the screw conveyor are formed in the interior sides of the blades of the screw conveyor.

The filtration tank may be filled with the liquid to be filtered so that the liquid surface is at least at the upper openings of the cleansing tank.

The filtration apparatus of the present invention is also a filtration apparatus for filtering liquid, which is introduced into a filtration tank that houses filtration media, and discharges filtered liquid to the exterior of the filtration tank, wherein:
a mounting opening that the filtration media is visible through is provided in the filtration tank above the filtration media;
a removably attachable lid is provided to cover the mounting opening; and
the lid is removed during cleansing of the filtration media, to insert and fix a cleansing means in the mounting opening, the cleansing means comprising a hollow cleansing tank, a screw conveyor for conveying the filtration media and the liquid upward while scrubbing the filtration media within the cleansing tank, and a drive mechanism for the screw conveyor, to perform cleansing of the filtration media.

The filtration apparatus of the present invention comprises the filtration tank, the hollow cleansing tank for cleansing the filtration media within the filtration tank, and the filtration media cleansing mechanism. The cleansing tank is a cylindrical body, which is suspended within the filtration tank from above. The screw conveyor, for conveying the filtration media and the liquid upward from the lower opening to the upper openings of the cleansing tank while scrubbing the filtration media, is provided within the cleansing tank. The mounting opening, for removably mounting the upper portion of the cleansing tank, is provided at the upper portion of the filtration tank. The cleansing portion, comprising the cleansing tank, the screw conveyor, and the drive mechanism for the screw conveyor, is removably mounted to the mounting opening. Therefore, the following advantageous effects are exhibited.

In the case that the cleansing tank and the screw conveyor are worn by relative movement with the filtration media, they can be removed from the upper portion of the filtration tank. The worn parts may be replaced by inserting them through the upper portion of the filtration tank. Accordingly, maintenance of the filtration apparatus is facilitated.

A configuration may be adopted wherein the lower end of the screw conveyor protrudes from the lower opening of the cleansing tank. In this case, the filtration media is easily pushed upward into the cleansing tank by the lower end of the screw conveyor during cleansing. Therefore, the cleansing efficiency is improved.

A configuration may be adopted wherein the cleansing portion is constructed by a plurality of parts, which are detachably linked so as to separate in the axial direction of the screw conveyor. In this case, even if the filtration apparatus is installed indoors in a room with a low ceiling, removal of the screw conveyor is facilitated by separating the cleansing portion. Accordingly, maintenance of the cleansing portion and the interior of the filtration apparatus, and replacement of the screw conveyor and the like, can be performed without being restricted by the installment location of the filtration apparatus.

A configuration may be adopted wherein slots that enable the filtration media to pass therethrough are formed at the lower portion of the cleansing tank so that at least a portion of the slots are below the upper surface of the filtration media. In this case, the filtration media easily flow into the cleansing tank through the slots. Therefore, the filtration media is easily housed within the cleansing tank as well, increasing the filtration function within the cleansing tank.

A configuration may be adopted wherein a plurality of gaps that extend along the outer periphery of the axis of the screw conveyor are formed in the interior sides of the blades of the screw conveyor. In this case, the following advantageous effects are exhibited. It is possible to reduce resistance of the filtration media, by performing backwash cleansing during removal of the cleansing tank and the screw conveyor, thereby causing the filtration media to float. At this time, liquid enters the cleansing tank through the gaps to enter the cleansing tank, more effectively causing the filtration media to float. Therefore, removal of the cleansing tank and the screw conveyor is further facilitated. In addition, back wash cleansing may be performed prior to driving a motor for the screw conveyor during cleansing. At this time also, the motor can be driven with low resistance by causing the filtration media to float in a similar manner.

The filtration tank may be filled with the liquid to be filtered so that the liquid surface is at least at the upper openings of the cleansing tank. In this case, the liquid enters the cleansing tank easily, enabling active filtration to be performed within the cleansing tank.

In addition, the filtration apparatus is of a configuration wherein the mounting opening that the filtration media is visible through is provided in the filtration tank above the filtration media, and a removably attachable lid is provided to cover the mounting opening. The lid is removed only during cleansing of the filtration media, to insert and fix the cleansing means in the mounting opening, the cleansing means comprising the hollow cleansing tank, the screw conveyor for conveying the filtration media and the liquid upward while scrubbing the filtration media within the cleansing tank, and the drive mechanism for the screw conveyor, to perform cleansing of the filtration media. Therefore, the following advantageous effect is exhibited.

That is, the cleansing means is not necessary during normal filtration. Therefore, the filtration apparatus may be provided at low cost, reducing an initial investment.

BEST MODE FOR CARRYING OUT THE INVENTION

Figure 1:
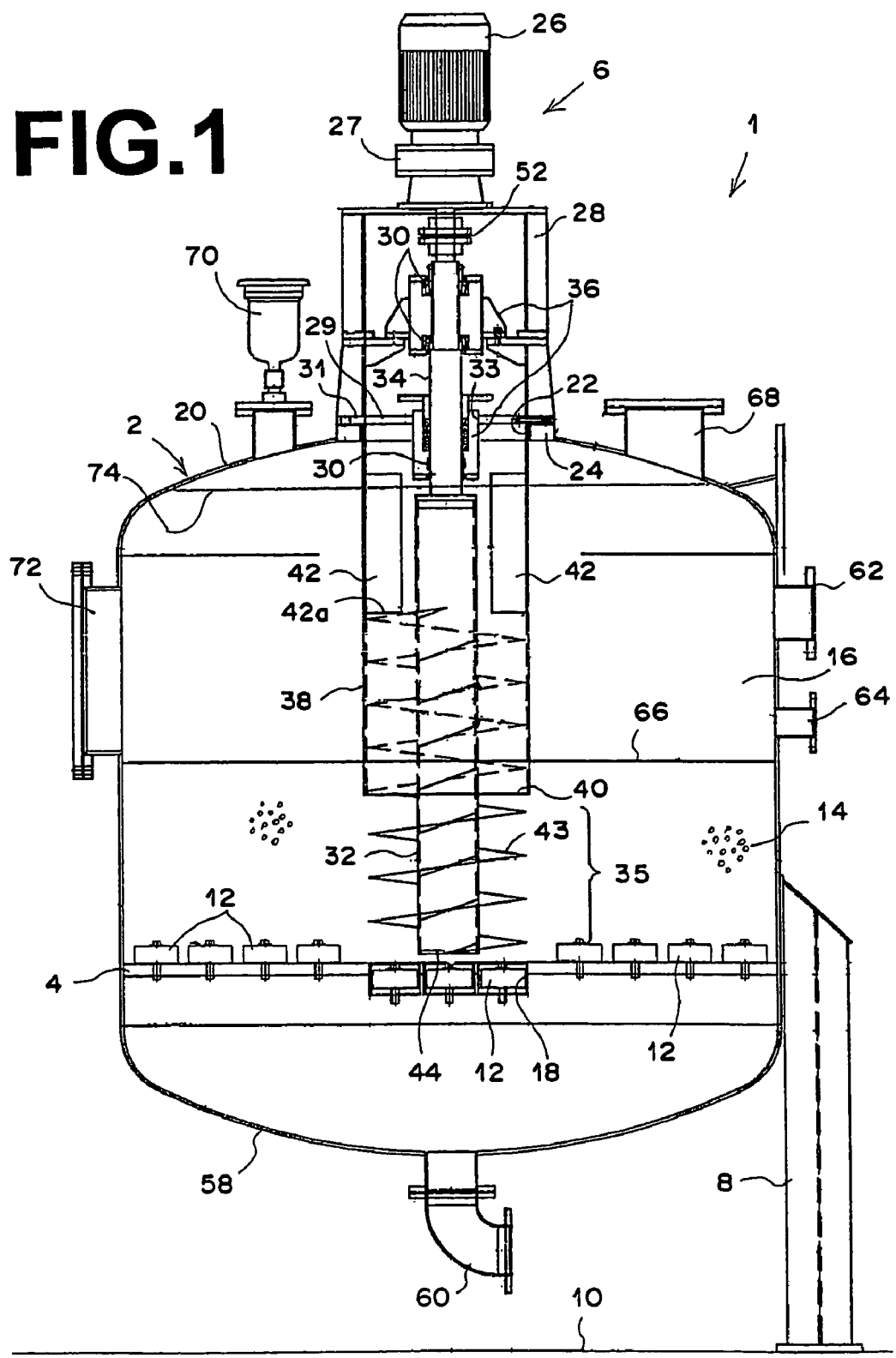
FIG. 1 is a sectional view of the main parts of a filtration apparatus according to a first embodiment of the present invention.
Figure 2:
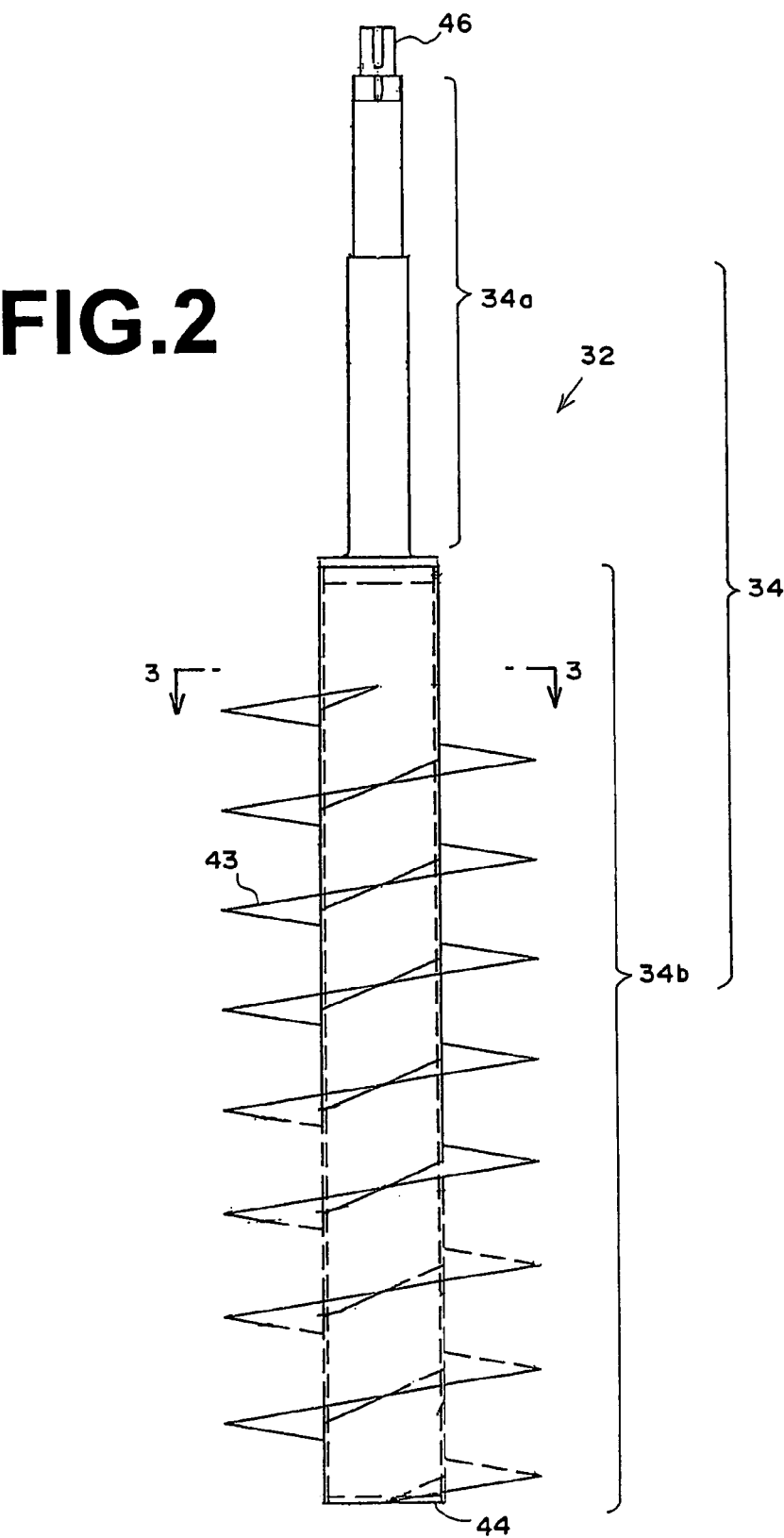
FIG. 2 is a front view of a screw conveyor, which is utilized in the filtration apparatus of FIG. 1.
Figure 3:
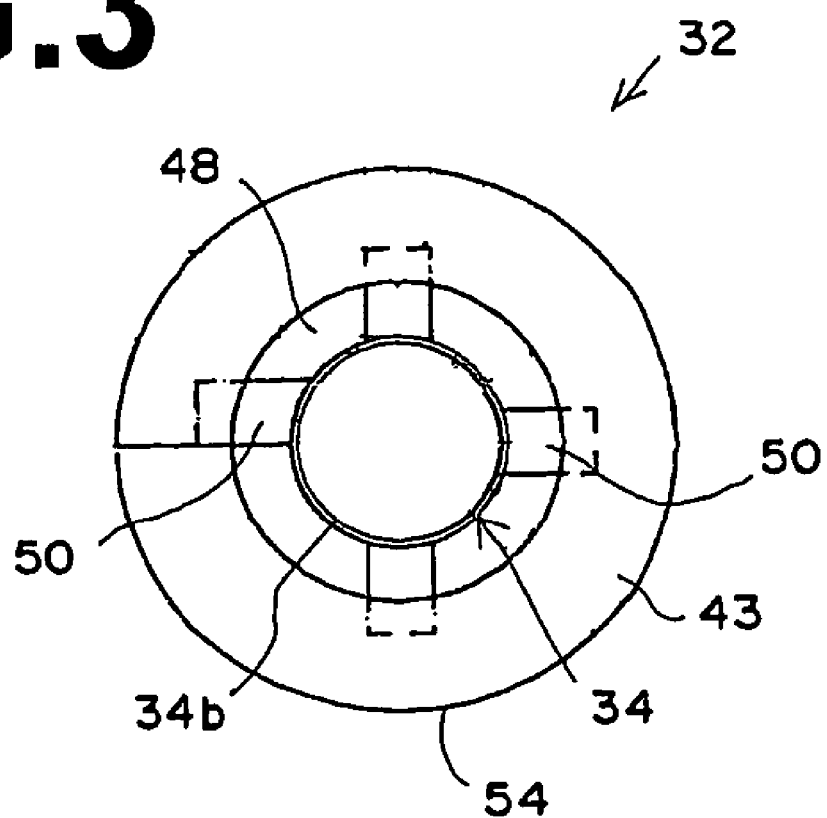
FIG. 3 is a sectional view of the screw conveyor, taken along the line 3-3 in FIG. 2.
Figure 4:
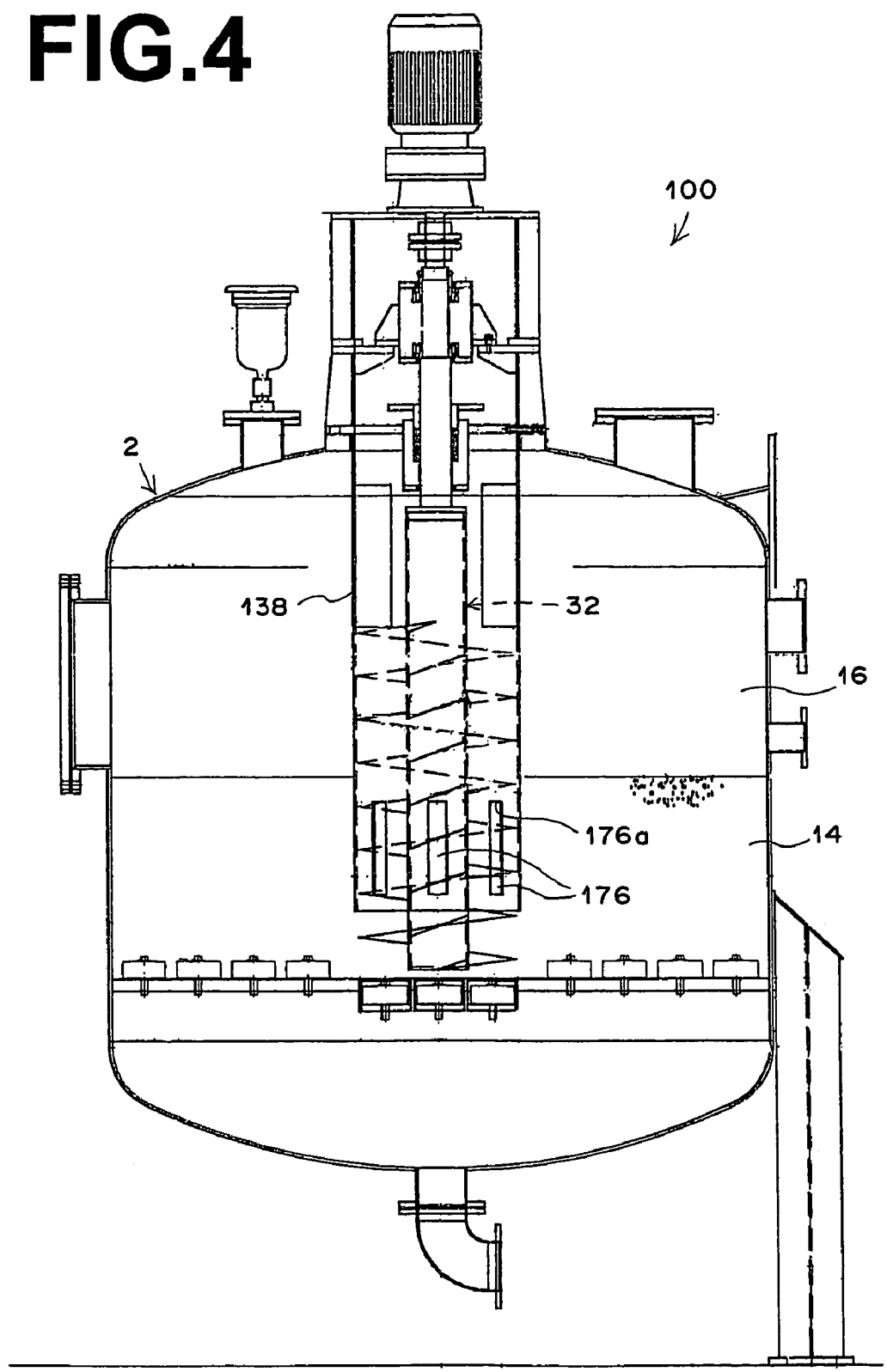
FIG. 4 is a sectional view of the main parts of a filtration apparatus according to a second embodiment of the present invention.

Hereinafter, the filtration apparatus of the present invention will be described in detail with reference to the attached drawings. FIG. 1 is a sectional view of the main parts of a filtration apparatus according to a first embodiment of the present invention. FIG. 2 is a front view of a screw conveyor, which is utilized in the filtration apparatus of FIG. 1. FIG. 3 is a sectional view of the screw conveyor, taken along the line 3-3 in FIG. 2. FIG. 4 is a sectional view of the main parts of a filtration apparatus according to a second embodiment of the present invention.

As illustrated in FIG. 1, the filtration apparatus 1 according to the first embodiment of the present invention comprises: a substantially cylindrical filtration tank 2 having closed upper and lower ends; a filtration floor 4, which has a great number of fine apertures (not shown) and is provided horizontally at a lower portion of the interior of the filtration tank 2; and a filtration media cleansing mechanism 6, which is mounted to a curved upper wall 20 of the filtration tank 2. A plurality of supporting legs 8 (only one is shown in the figure) are mounted on the filtration tank 2. The filtration tank 2 is installed on a floor 10 via the supporting legs 8. A great number of short cylindrical ceramic filters 12, which have fine apertures, are provided on the filtration floor 4. The filters 12 have strength to withstand filtration media 14 that accumulates on the filtration floor 4, and water (liquid) 16 within the filtration tank 2. The filters 12 operate to efficiently pass only purified water 16 below the filtration floor 4.

Radially extending recesses 18 are formed in the central portion of the filtration floor 4. Filters 12 are also provided within these recesses 18, causing the height of the filters 12 at the central portion of the filtration floor 4 to be low. The reason for forming the recesses 18 will be described later.

A circular mounting opening 22 is formed at the central portion of the upper wall 20 of the filtration tank 2. The filtration media cleansing mechanism 6 is mounted in the mounting opening 22. The periphery of the mounting opening 22 is formed into a rim 24 for mounting. A base 28, on which a motor 26 and a brake mechanism 27 are mounted, is mounted on the rim 24. A holding portion 36, which has bearings 30 at three locations, is formed within the base 28. The bearings 30 at the three locations rotatably support a shaft 34 of a screw conveyor 32.

Next, the filtration cleansing mechanism 6 will be described in detail, with reference to FIG. 2 and FIG. 3 as well. A cleansing tank 38, which is a cylindrical body, is provided with a discoid partition wall 29 at the upper portion thereof. A flange 31 at the outer periphery of the partition wall 29 is mounted onto the rim 24, and secured thereto with bolts, along with the base 28. Accordingly, it is necessary that the mounting opening 22 is of a size that enables the cleansing tank 38 to pass therethrough. In this manner, the upper portion of the cleansing tank 38 is mounted onto the rim 24, and substantially the entirety of the cleansing tank 38 is suspended from the upper wall 20. An aperture 33 that engages the holding portion 36 to form a seal therewith is formed in the center of the flange 31. Thereby, the interior of the filtration tank 2 is maintained in a sealed state during filtration.

The lower portion of the cleansing tank 38 is open, to form a circular lower opening 40. A plurality of upper openings 42 that extend in the vertical direction are formed at predetermined intervals in the upper portion of the cleansing tank 38. The positional relationship between the filtration media and the lower opening 40 is determined so that the lower opening 40 is positioned within the filtration media 14. The screw conveyor 32 is provided within the interior of the cleansing tank 38. As illustrated in FIG. 1 and FIG. 2, the shaft 34 of the screw conveyor 32 comprises a reduced diameter portion 34a and a large diameter portion 34b. The reduced diameter portion 34a is supported by the bearings 30. A link portion 46, for linking the shaft 34 with the motor 26, is formed at the upper end of the shaft 34. The large diameter portion 34b, which is provided to add strength to the shaft 34, is a hollow pipe with a closed end 44. A spiral screw blades 43 is formed on the large diameter portion 34b. The blade 43 is formed to the lower end 44 of the shaft 34.

As shown in FIG. 3, a gap 48 is formed in the inner periphery of the blade 43, along the outer periphery of the shaft 34. In the present embodiment, the gap 48 is formed continuously along the outer periphery of the shaft 34. The blade 43 is linked to the shaft 34 by welding link pieces 50 (supporting members) thereto at predetermined intervals. Note that the gap 48 and the link pieces 50 are omitted from FIG. 1 and FIG. 2. The gap 48 is formed continuously in the present embodiment. However, a plurality of gaps may be formed along the outer periphery of the shaft 34. In this case, the link between the shaft 34 and the blade 43 maybe established by support members which are integrally formed with the blade 43, instead of the separate link pieces 50.

The aforementioned gap 48 (ribbon space) between the outer periphery of the shaft 34 and the blade 43 is set to be within a range from 1% to 98% of the area of the blade 43. Preferably, the gap is set to be within a range from 30% to 60%. If the gap 48 is not provided, the filtration media 14 does not sufficiently enter the cleansing tank 38 during backwash cleansing, to be described later. However, if the gap 48 is excessively large, the filtration media 14 becomes difficult to convey toward the upper portion of the cleansing tank 38 during cleansing. Accordingly, the appropriate area ratio of the blade 43 and the gap 48 is set as described above.

The link portion 46 at the upper end of the screw conveyor 32 is linked to the brake mechanism 27 of the motor 26 via a coupling 52. When the blade 43 of the screw conveyor 32 is placed within the cleansing tank 38 in this manner, the upper end of the blade 43 is positioned in the vicinity of the lower edges 42a of the upper openings 42, as illustrated in FIG. 1. In addition, the lower portion 35 of the screw conveyor 32 (refer to FIG. 1) protrudes downward from the lower opening 40 of the cleansing tank 38, and the lower end 44 of the shaft 34 is positioned in the vicinity of the filtration floor 4. This configuration enables the most efficient cleansing of the filtration media 14 in the vicinity of the filtration floor 4 during cleansing of the filtration media 14. The outer peripheral edge 54 of the screw conveyor 32 (refer to FIG. 3) is placed so as to form a slight gap between it and the inner peripheral surface of the cleansing tank 38. The dimension of the gap is approximately two to three times the particle diameter of the filtration media 14. The gap may be larger, but the maximum allowable size of the gap is approximately 30 mm. The gap is provided to reduce the possibility of the filtration media 14 being crushed, in the case that the filtration media 14 is trapped between the blade 43 and the cleansing tank 38. In other words, if the gap (clearance) is smaller than the dimensions described above, the filtration media 14 will be trapped and crushed between the outer edge 54 of the blade 43 and the inner peripheral surface of the cleansing tank 38. This will preclude the obtainment of desired filtration function during filtration. If the gap is larger than the dimensions described above, the filtration media 14 will drop through the gap, and not be discharged through the upper openings 42 of the cleansing tank 38. That is, only the same filtration media 14 will be cleansed, and the filtration media 14 to the exterior of the cleansing tank 38 in the radial direction will not be cleansed. The manner of cleansing will be described later.

Next, the parts which are attached to the exterior of the filtration tank 2 will be described with reference to FIG. 1. A downwardly extending purified water discharge pipe 60 is mounted onto the center of the curved bottom wall 58 of the filtration tank 2. Purified water, which has passed through the filtration media 14, the filtration floor 4, and the filters 12 are discharged via the purified water discharge pipe 60. A raw water filling opening 62 (contaminant expulsion means) is positioned at the right side of the filtration tank in FIG. 1. The filtration tank 2 is filled with raw water, that is, unfiltered water 16, through the raw water filling opening 62 during filtration. A water level adjusting opening 64 is positioned below the raw water filling opening 62. The water level adjusting opening 64 serves to optimize the water level during cleansing of the filtration media 14, by expelling water 16 from the filtration tank 2 therethrough. The amount of water 16 necessary during cleansing is that which realizes fluidization of the filtration media 14 at the upper openings 42 of the cleansing tank 38. However, if the amount of water 16 is excessive, the particle density of the filtration media 14 on the screw conveyor 32 is decreased. The decrease in particle density decreases opportunities for the particles to scrub against one another, thereby deteriorating the cleansing efficiency. In the present embodiment, the ratio of filtration media 14 to water 16 that yields the most efficient cleansing function is 2:1.

Reference numeral 68 in FIG. 1 denotes an inspection opening, which is utilized to inspect the state of the interior of the filtration tank 2. An air release valve 70 is positioned on the upper wall 20 of the filtration tank 2, on the left side in FIG. 1. The air release valve 70 enables filling of the filtration tank 2 with raw water, by expelling air within the filtration tank 2. During cleansing, the amount of raw water is decreased. Therefore, at this time, air is caused to flow into the filtration tank 2 from the exterior, to decrease the amount of raw water without generating negative pressure. Reference numeral 72 denotes a filtration media filling opening.

Next, the filtration operation within the filtration tank 2 will be described. First, the filtration tank 2 is filled with raw water through the war water filling opening 62, under pressure from a pump (not shown). As the water level 74 rises, air within the filtration tank 2 is expelled through the air release valve 70. In the present embodiment, the water level 74 is set so that it rises above the raw water filling opening 62 and reaches the upper portion of the filtration tank 2. That is, the water level 74 is set so that substantially the entirety of the filtration tank 2 is filled with water 16 (raw water). The water level 74 illustrated in FIG. 1 is at a position prior to the filtration tank 2 being filled with water. The water 16 permeates the filtration media 14 in the filtration tank 2, and also enters the cleansing tank 38 via the upper openings 42, to permeate the filtration media 14 within the cleansing tank 38. This enables filtration to be performed within the cleansing tank 38 as well. The water, which has permeated the filtration media 14 and has been filtered, is discharged to the exterior via the purified water discharge pipe 60, provided at the lower portion of the filtration tank 2. The purified water is then utilized.

Next, the method of cleansing the filtration media 14, when the filtration media 14 has been utilized over a long period of time and clogging is generated therein, will be described. Purified water is backwashed through the purified water discharge pipe 60 prior to driving the motor 26 that rotates the screw conveyor 32, to cause the filtration media 14 to float. Thereby, the load on the motor 26 during startup is reduced. When the motor 26 is driven, the screw conveyor 32 rotates. The filtration media 14 is conveyed upward to the interior of the cleansing tank 38, by the blade 43 of the rotating screw conveyor 32, particularly by the portion of the blade 43 that protrudes below the cleansing tank 38. The backwash of the purified water is continued during the initial stage of rotation of the screw conveyor 32. This is because mixing of the filtration media 14 at the radially outer and inner portions of the cleansing tank 38 is facilitated by rotating the screw conveyor 32 in the backwash cleansing state, due to centrifugal force of the screw conveyor 32. At the same time, the entirety of the filtration media 14 is thoroughly cleansed by this movement. The backwash of the purified water is ceased thereafter. However, the rotation of the screw conveyor 32 is continued to perform cleansing. The particles of the filtration media 14 are conveyed upward by the rotation of the screw conveyor 32 while rubbing against and scrubbing each other, and are discharged from the upper openings 42 into the filtration tank 2. Separation of contaminants from the filtration media 14 is enhanced by the impact of the filtration media 14 with the surface of the water 16. The filtration media 14 which has dropped back into the filtration tank 2 is conveyed upwards into the cleansing tank 38 repeatedly, and scrubbed therein. In this manner, contaminants are separated from the filtration media 14 by repetitive cleansing within the cleansing tank 38. As illustrated in FIG. 1, the lower end 44 of the screw conveyor 32 is positioned in the vicinity of the filtration floor 4. Therefore, the filtration media 14 close to the filtration floor 4 is conveyed upward as well, thereby thoroughly cleansing the entirety of the filtration media 14.

When cleansing is complete, purified water is backwashed through the purified water discharge pipe 60 again. The backwash cleansing is continued after rotation of the screw conveyor 32 is ceased. Contaminants, which have been separated from the filtration media 14, are caused to float by the backwash, and are expelled to the exterior through the raw water filling opening 62, along with water that contains contaminants. The water 16 is effectively backwashed through the interior of the cleansing tank 38 as well, by passing through the gap 48 of the blade 43. Therefore, contaminants within the cleansing tank 38 are expelled as well. By continuing the backwash cleansing for a predetermined amount of time, all of the contaminants within the filtration tank 2 are removed.

Next, replacement of the cleansing tank 38 and the screw conveyor 32 when they become worn will be described. The cleansing tank 38 and the screw conveyor 32 can be extracted to the exterior of the filtration tank 2, by removing the bolts (not shown) that fix the base 28 and the rim 24 to each other, and by removing the base 28 from the rim 24. At this time, the blade 43 of the screw conveyor 32 is buried in the filtration media 14. Resistance against extraction is reduced by backwash of purified water through the purified water discharge pipe 60, thereby causing the filtration media 14 to float. In this manner, the screw conveyor 32 and the cleansing tank 38 may be easily extracted. Only the screw conveyor 32 may be removed, according to maintenance requirements. When the screw conveyor 32 and the cleansing tank 38 are reinstalled, backwash of purified water through the purified water discharge pipe 60 is performed again. This causes the filtration media 14 to float, thereby reducing the resistance against insertion by the filtration media 14. In this manner, the screw conveyor 32 and the cleansing tank 38 may be easily reinstalled.

Next, a filtration apparatus 100 according to a second embodiment of the present invention will be described with reference to FIG. 4. Note that the parts of the filtration apparatus 100 which are in common with those of the first embodiment will be described by using the same reference numerals. The filtration apparatus 100 differs from the filtration apparatus 1 of the first embodiment in that a cleansing tank 138 extends downward longer than the cleansing tank 38, and a plurality of slots 176 are provided therein. The slots 176 extend vertically, and are provided at the lower portion of the cleansing tank 138 at intervals along the circumferential direction thereof. The vertical length of the blade 43, which is housed within the cleansing tank 138, can be extended, due to the extended length of the cleansing tank 138. The cleansing function is improved by this configuration, because the distance, over which the filtration media 14 is scrubbed, is increased.

The slots 176 are formed to be of a size that allows the particles of the filtration media 14 to pass therethrough. The slots 176 facilitate entry of the filtration media 14 into the cleansing tank 138. The slots 176 may be of any desired shape, such as elongated in the horizontal direction. Entry of the filtration media 14 into the cleansing tank 13 may be further facilitated, by setting a positional relationship in which the height of the upper edges 176a of the slots 176 are above the upper surface 66 of the filtration media 14.

Figure 5:
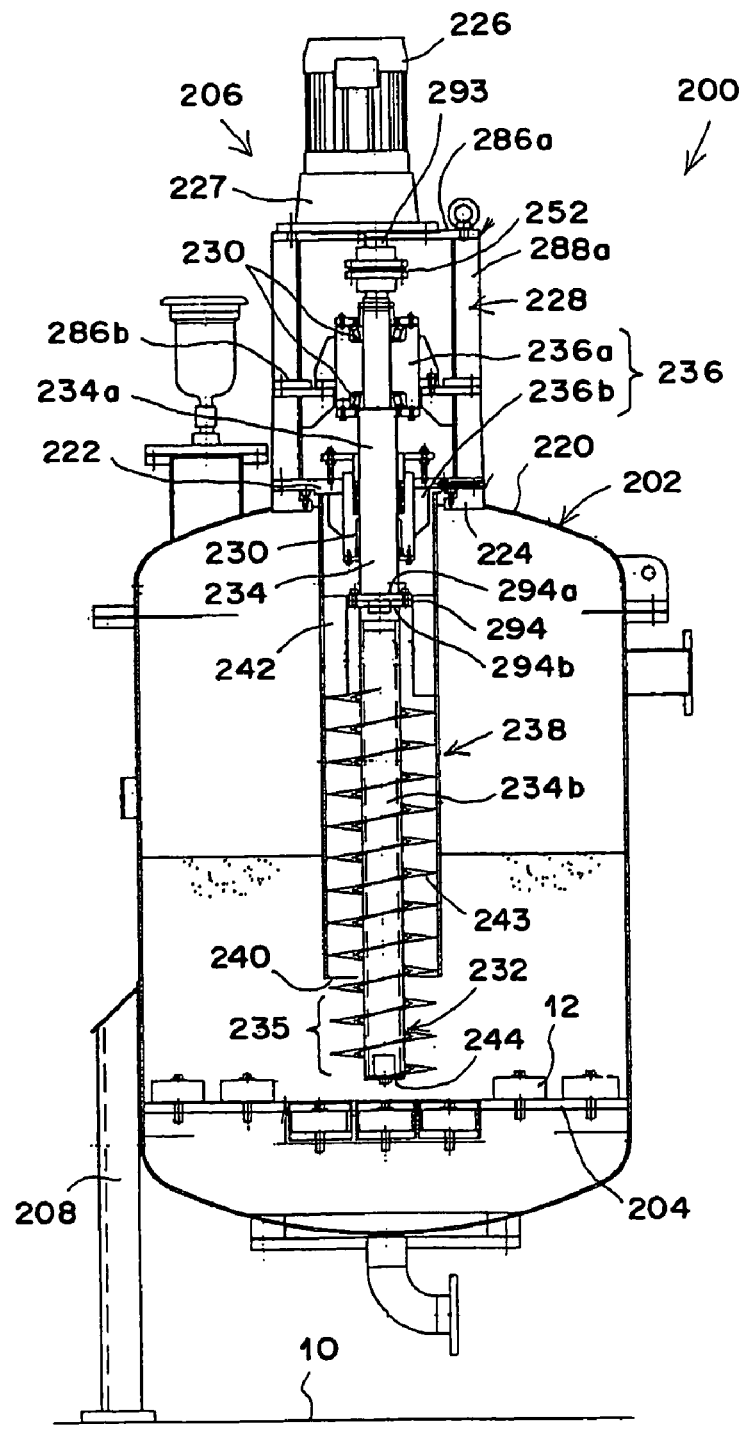
FIG. 5 is a sectional view of the main parts of a filtration apparatus according to a third embodiment of the present invention.

Next, a filtration apparatus 200 according to a third embodiment of the present invention will be described with reference to FIG. 5. FIG. 5 is a sectional view of the main parts of the filtration apparatus 200 according to the third embodiment of the present invention. The filtration apparatus 200 differs from the filtration apparatuses of the first and second embodiments in that the screw conveyor is separable into a plurality of parts. Thereby, assembly and disassembly of the filtration apparatus is enabled within a space having a small vertical height. Note that in the following description, the parts of the filtration apparatus 200 which are in common with those of the previous embodiments will be described by using the same reference numerals.

As illustrated in FIG. 5, the filtration apparatus 200 comprises support legs 208, and a filtration tank 202. The filtration tank 202 is of a larger dimension in the vertical direction than those of the previous two embodiments. A filtration floor 204, which is similar to that of the previous embodiments, is provided at the lower portion of the filtration tank 202. A plurality of filters 12 are provided on the filtration floor 204, as in the previous embodiments. A base 228, on which a motor 226 and a brake mechanism 227 are mounted, is mounted on a rim 224 of the upper wall 220 of the filtration tank 202. The base 228 is of a similar construction as those of the previous two embodiments, and comprises a holding portion 236 (236a and 236b), which is separable in the vertical direction, for holding a screw conveyor 232. The details of the base 228 and the holding portion 236 will be described later.

A cylindrical cleansing tank 238 and the screw conveyor 232 are placed in a mounting opening 222 formed by the rim 224. The cleansing tank 238 is longer than those of the previous two embodiments, and the screw conveyor 232 protrudes downwardly through a lower opening 240 of the cleansing tank 238.

Figure 6:
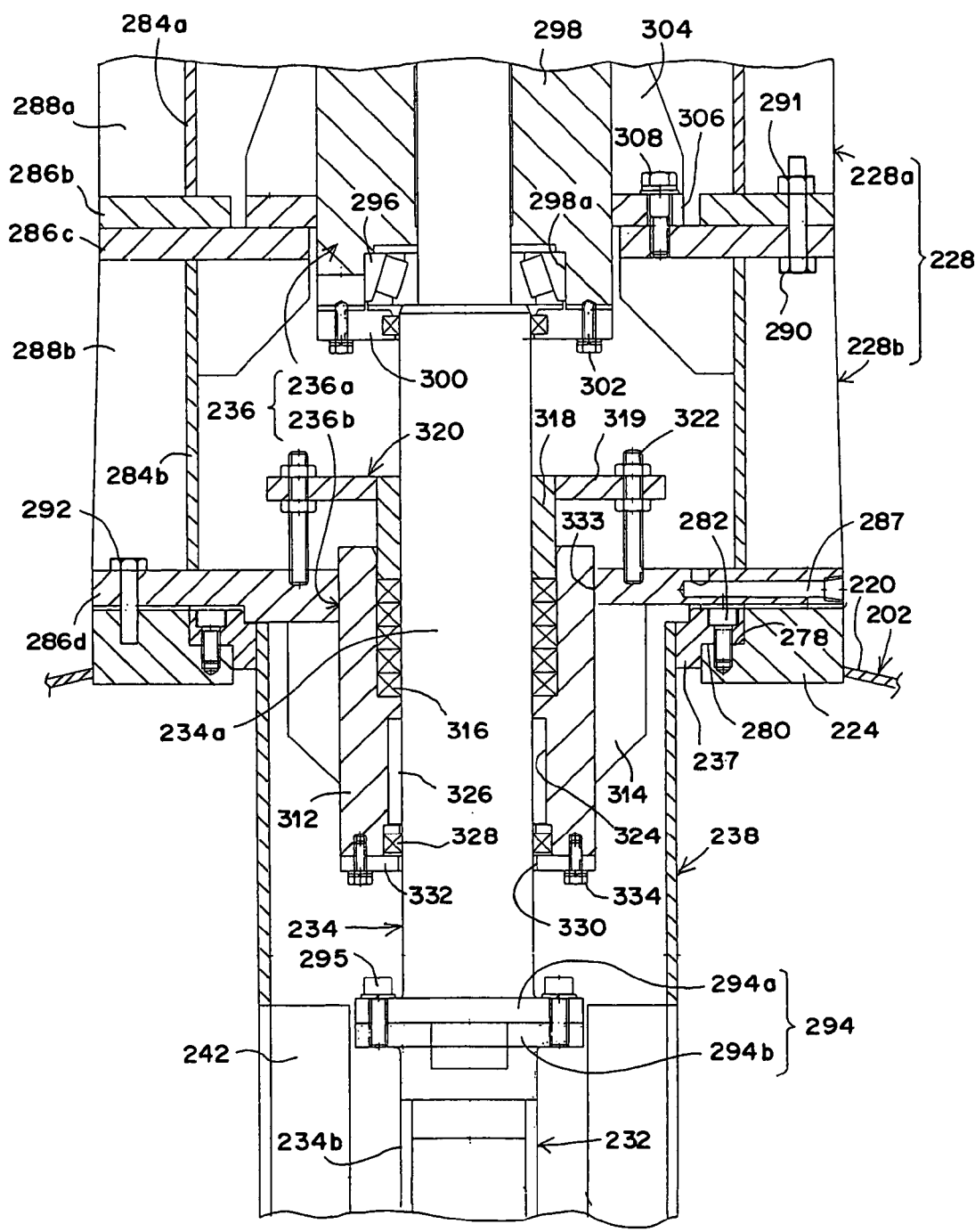
FIG. 6 is a partial magnified view of the vicinity of a mounting opening of the filtration apparatus of FIG. 5.

Next, the screw conveyor 232, the cleansing tank 238, and the base 228 will be described in further detail, with combined reference to FIG. 6. FIG. 6 is a partial magnified view of the vicinity of the mounting opening 222. The mounting opening 222 is formed by the annular rim 224 being welded to the upper end of the filtration tank 202. The rim 224 comprises an upwardly facing step 278 at its inner periphery. Meanwhile, a flange 237 is welded to the outer periphery of the upper end of the cylindrical cleansing tank 238.

A downwardly facing annular step 280, which is complementary to the step 278 of the rim 224, is formed at the outer periphery of the flange 237. The steps 278 and 280 are configured such that the step 280 is seated on the step 278 when the cleansing tank 238 is inserted into the mounting opening 222 from above. The steps 278 and 280 are fixed to each other by a plurality of bolts 282, which are provided along the circumferential direction thereof. In this manner, the cleansing tank 238 is removably attached to the filtration tank 202. Note that in the figures, only a portion of the bolts 282 is illustrated. As illustrated in FIG. 5, the lower opening 240 of the cleansing tank 238 is positioned above the filtration floor 204. That is, a gap exists between the lower opening 240 and the filtration floor 204. The lower end 235 of the screw conveyor 232 protrudes from the lower opening 240, to be positioned within this space. Note that the screw conveyor 232 will be described in detail later.

Next, the base 228 will be described with reference to FIG. 5 and FIG. 6. The base 228 comprises an upper base 228a and a lower base 228b (refer to FIG. 6). The upper base 228a comprises a cylindrical member 284a, an annular member 286a, and an annular member 286b. The annular members 286a and 286b are welded to the upper and lower ends of the cylindrical member 284a, respectively. The upper annular member 286a, the lower annular member 286b, and the cylindrical member 284a are reinforced by a plurality of reinforcement ribs 288a, which are provided along the circumferential direction and welded perpendicularly thereto. The lower base 228b comprises a cylindrical member 284b, an annular member 286c (partition wall), and an annular member 286d (partition wall). The cylindrical member 284b has a shorter dimension in the vertical direction than the cylindrical member 284a. The annular members 286c and 286d are welded to the upper and lower ends of the cylindrical member 284b, respectively. The annular member 286c, the annular member 286d, and the cylindrical member 284b are reinforced by a plurality of reinforcement ribs 288b, which are provided along the circumferential direction and welded perpendicularly thereto.

The upper base 228a and the lower base 228b are linked by a plurality of sets of bolts 290 and nuts 291, which are provided along the circumferential direction of the annular members 286b and 286c, thereby constructing the integrated base 228. The base 228 is mounted to the filtration tank 202 by the annular member 286d being fixed to the rim 224 with the plurality of bolts 292, which are provided along the circumferential direction of the rim 224. That is, the annular member 286d is mounted to the filtration tank 202 by the bolts 292, at a flange portion that protrudes outward from the outer periphery of the cylindrical member 284b. Note that a channel 287 is provided within the annular member 286d so as to communicate the interior and the exterior of the cylindrical member 284b. The channel 287 serves as a drain for expelling water that enters the cylindrical member 286d.

Referring again to FIG. 5, the motor 226 and the brake mechanism 227, which is integral with the motor 226, are mounted on the base 228, which is mounted on the filtration tank 202 in this manner, with bolts (not shown). A rotating shaft 293 of the brake mechanism 227 and a shaft 234 of the screw conveyor 232 are linked via a coupling 252.

Next, the screw conveyor 232 and a support structure therefor will be described. As illustrated in FIG. 5, the screw conveyor 232 comprises an upper shaft 234a and a lower shaft 234b. The upper shaft 234a is held by the holding portion 236. The lower shaft 234b is detachably linked to the upper shaft 234a. The screw conveyor 232 differs from those of the previous two embodiments in that the upper shaft 234a and the lower shaft 234b are separable at a separating portion 294. The separating portion 294 enables separation of the upper and lower shafts 234a and 234b, by linking the two at flanges 294a and 294b with bolts 295. The flange 294a is formed at the lower end of the upper shaft 234a, and the flange 294b is formed at the upper and of the lower shaft 234b. The reason that the screw conveyor 232 is provided to be separable will be described later. A spiral blade 243 is formed on the screw conveyor 232 to the lower end 244 of the shaft 234, in a similar manner to those of the previous two embodiments. The separating portion 294 is provided at a portion of the shaft 234 where the blade 243 is not formed, in the vicinity of the upper end of the blade 243. This is in order to secure as long a dimension as possible for the blade 243, while effectively reducing the dimensions of the shaft 234 after separation. As a result, the separating portion 294 is positioned in the vicinity of the upper ends of upper openings 242 of the cleansing tank 238.

Next, the holding portion 236 will be described with reference to FIG. 5 and FIG. 6. The upper holding portion 236a comprises a cylindrical main body 298 and tapered roller bearings 296 at the upper and lower ends thereof. The tapered roller bearings 296 rotatably hold the upper shaft 234a of the shaft 234 in a vertical orientation. The tapered roller bearings 296 are provided within recesses 298a, which are formed in the upper and lower ends of the main body 298. Annular plates 300 are fixed to the upper and lower ends of the main body 298 with screws 302. The annular plates 300 serve to prevent extraction of the tapered roller bearings 296. A plurality of vertically extending ribs 304 are welded along the outer periphery of the main body 298. Each of the ribs 304 has a horizontally fixing piece 306 at the lower end thereof. The fixing pieces 306 are fixed to the annular member 286c with bolts 308. In this manner, the upper holding portion 236a is fixed to the lower base 228b.

Next, the lower holding portion 236b will be described. A circular aperture 333 for housing the lower holding portion 236b is formed in the annular member 286d. The lower holding portion 236b comprises a cylindrical main body 312 that extends in the axial direction of the upper holding portion 236a. The lower holding portion 236b is placed within the aperture 333 and fixed thereto by welding. At the same time, ribs 314 are welded to the main body 312 and the annular member 236d, to strengthen the link between the main body 312 and the annular member 286d. Packing material 316 is provided between the main body 312 and the shaft 234, in the upper portion of the main body 312. The packing material 316 is held by a cylindrical stop 318 of an extraction preventing member 320. The extraction preventing member 320 is fixed to the annular member 286d with screws 322, which are held in a flange 319 that protrudes from the stop 318. A bearing 326 is provided in a space 324 at the lower portion of the main body 312. An oil seal 328 is provided below the bearing 326. A discoid plate 332 having an opening 330 formed therein is provided below the oil seal 328. The discoid plate 332 serves to prevent extraction of the oil seal 328. The shaft 234 penetrates the opening 330, and the discoid plate 332 is fixed to the main body 312 with screws 334.

Figure 7:
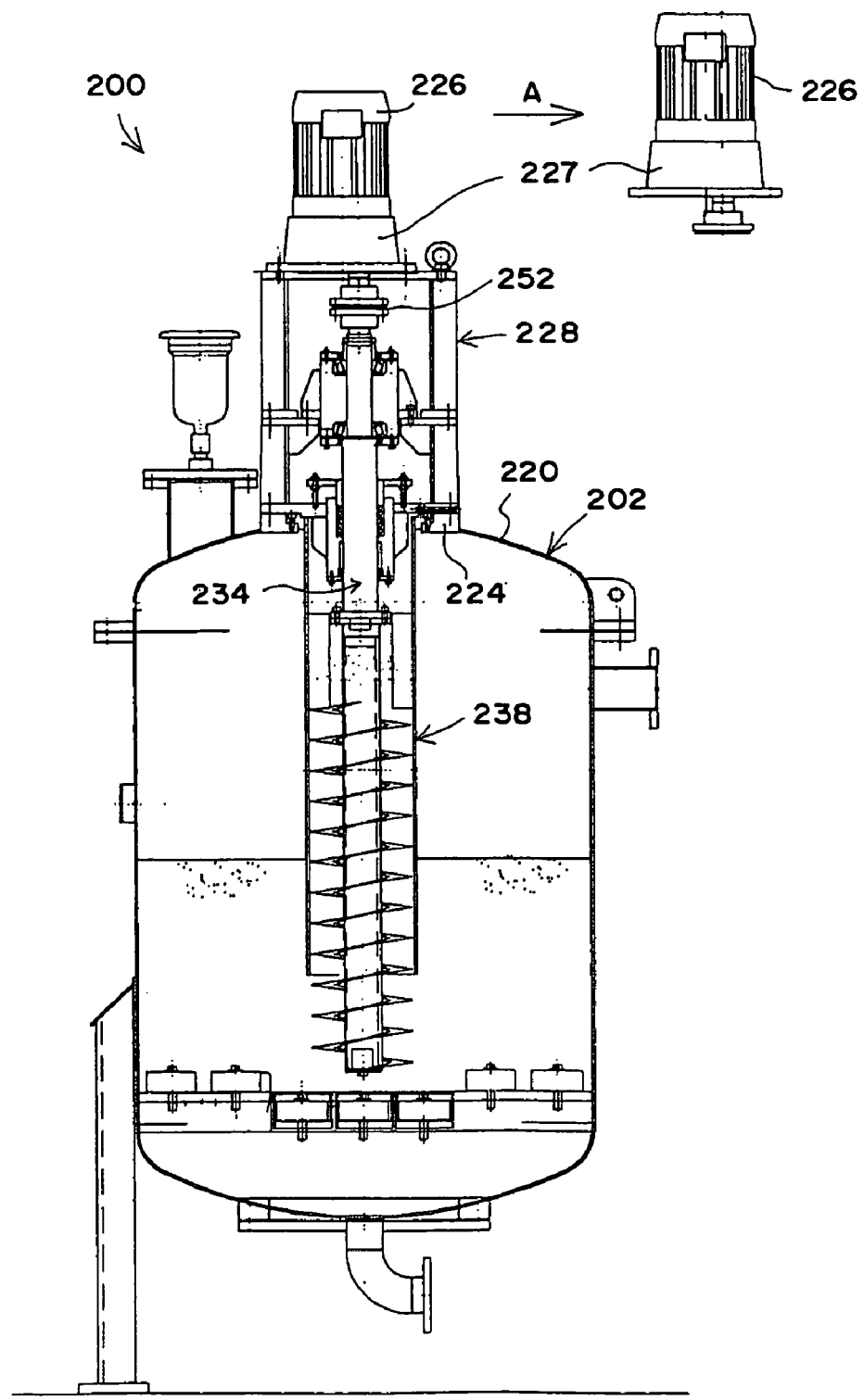
FIG. 7 is a sectional view of the main parts of the filtration apparatus of FIG. 5, illustrating the process of removing a motor from the filtration apparatus.
Figure 8:
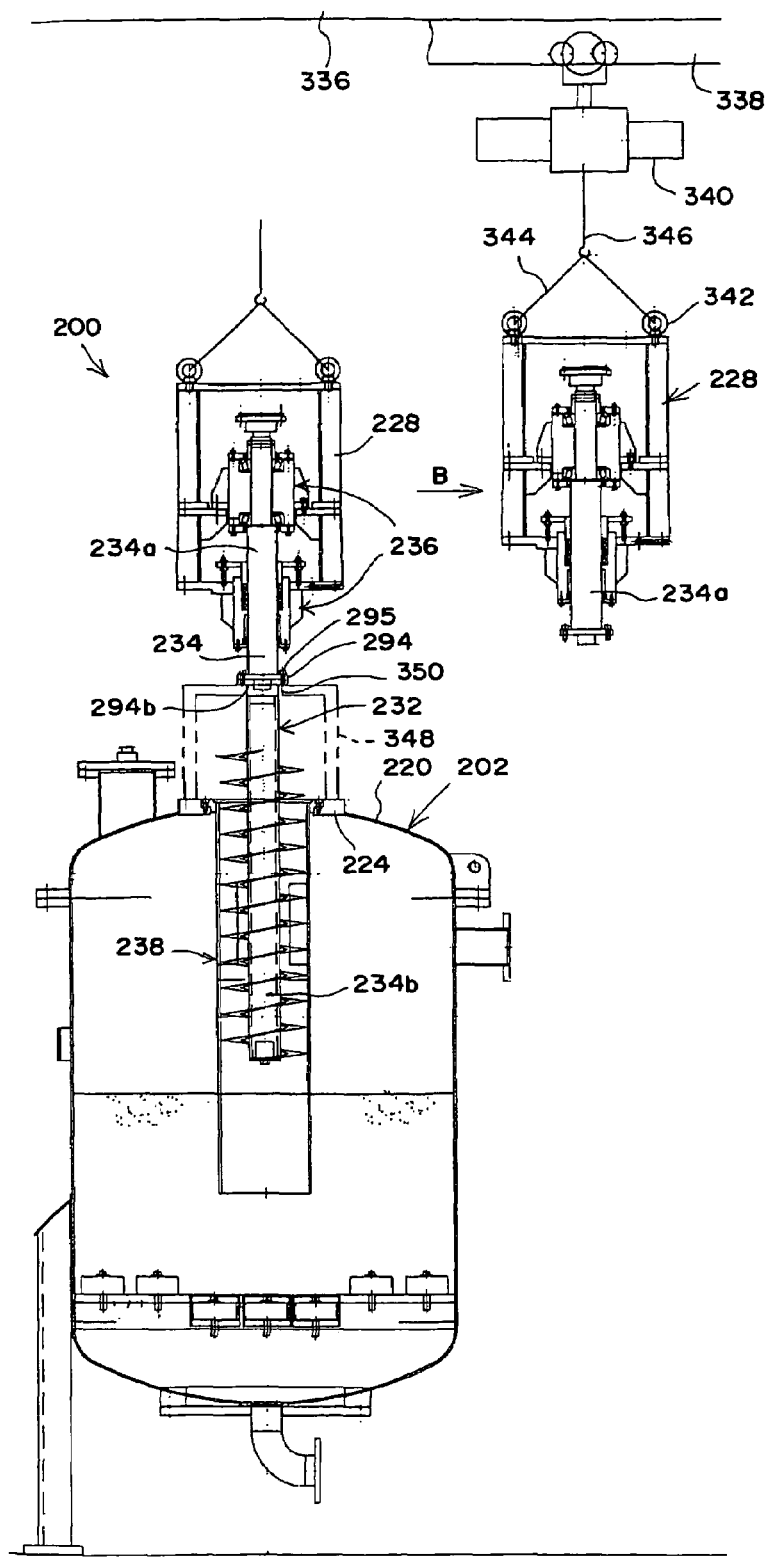
FIG. 8 is a sectional view of the main parts of the filtration apparatus of FIG. 5, illustrating the process of removing a base from the filtration apparatus.
Figure 9:
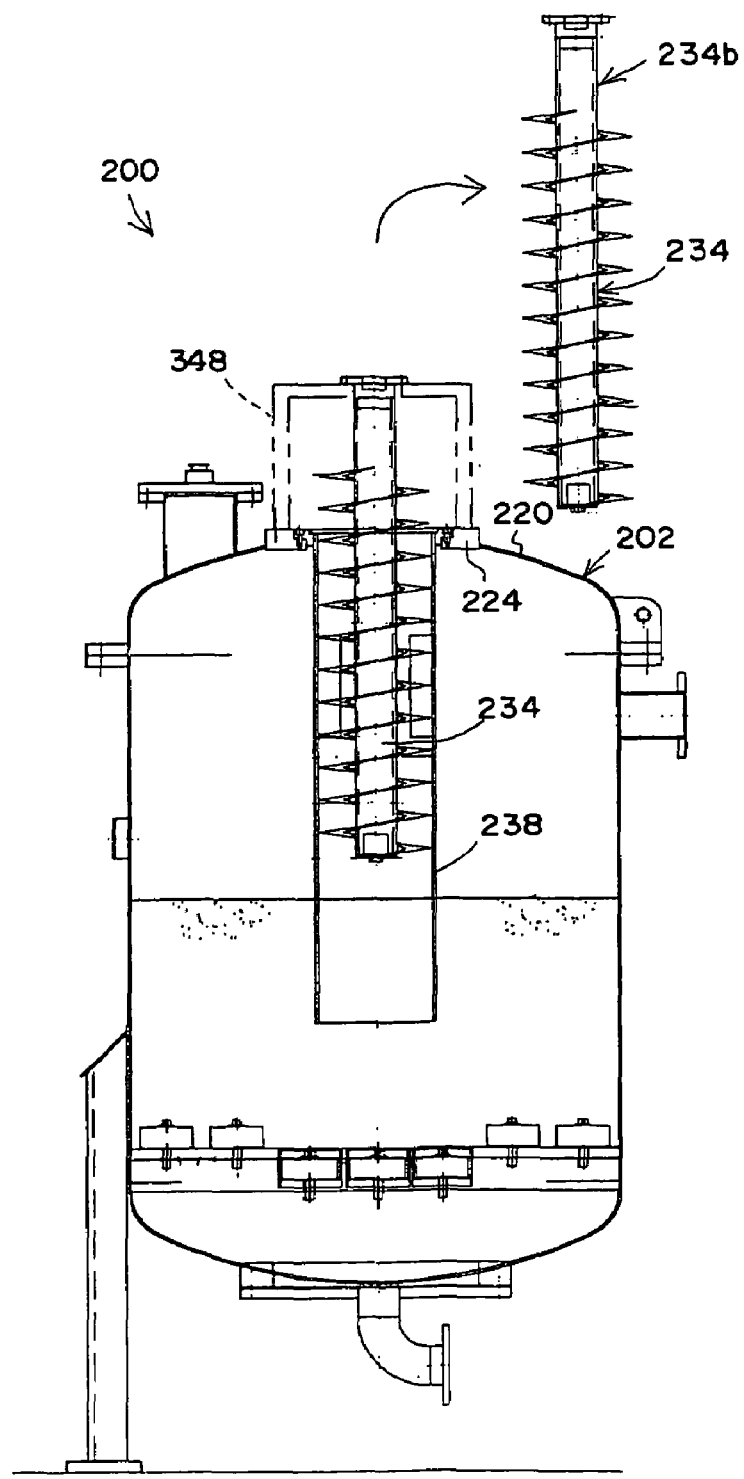
FIG. 9 is a sectional view of the main parts of the filtration apparatus of FIG. 5, illustrating the process of removing a lower shaft from the filtration apparatus.
Figure 10:
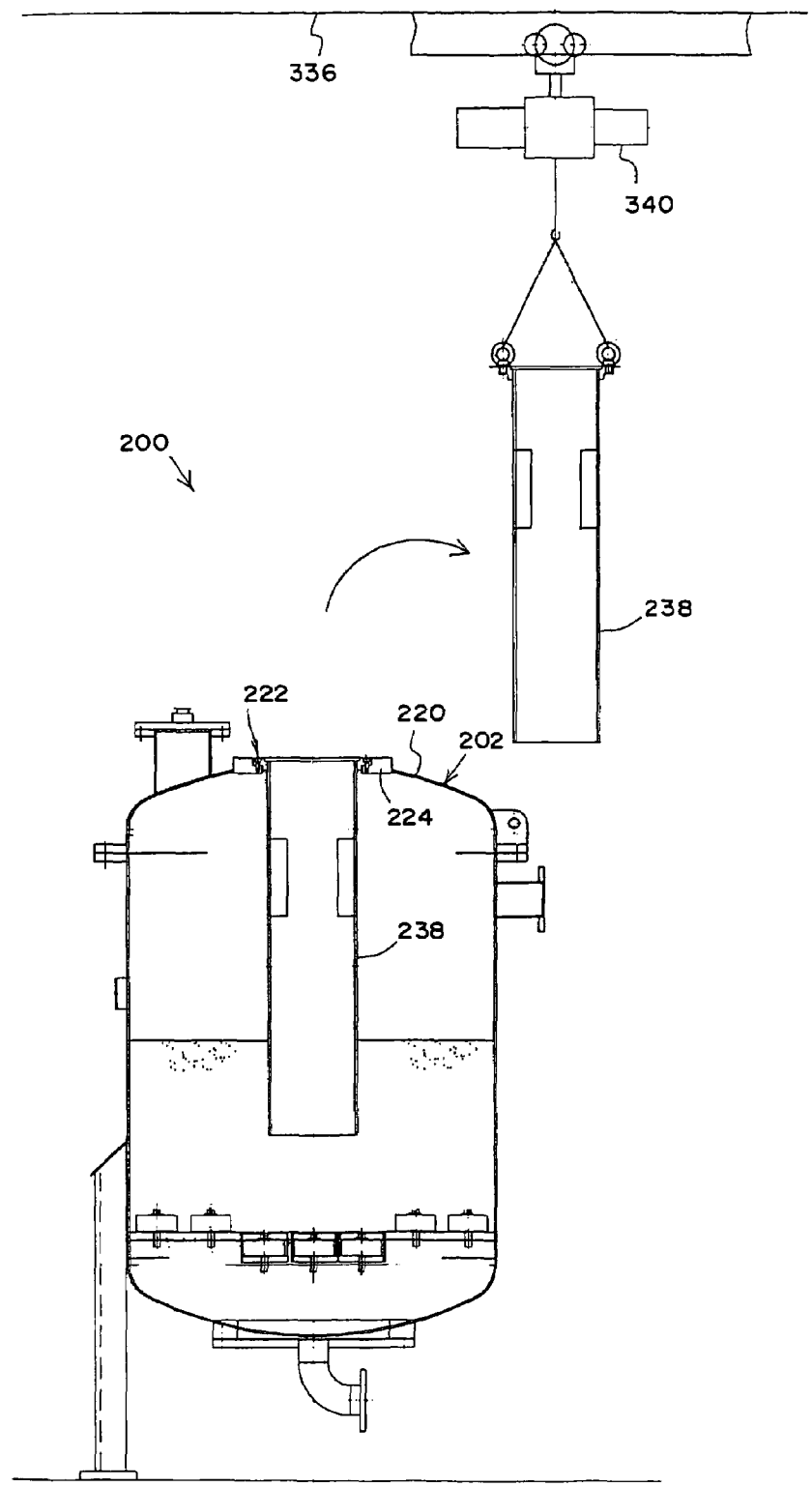
FIG. 10 is a sectional view of the main parts of the filtration apparatus of FIG. 5, illustrating the process of removing a cleansing tank from the filtration apparatus.

There are cases in which the filtration apparatus 200, which is constructed in the manner described above, is installed and utilized indoors. After a predetermined period of use in this utilization state, it becomes necessary to perform maintenance and replacement of the screw conveyor 232 and the like, which become worn. The steps involved in the disassembly process of the filtration apparatus 200 for maintenance operations will be described with reference to FIG. 7 through FIG. 10. FIG. 7 is a sectional view of the main parts of the filtration apparatus 200, illustrating the process of removing the motor 226 therefrom. FIG. 8 is a sectional view of the main parts of the filtration apparatus 200, illustrating the process of removing the base 228 therefrom. FIG. 9 is a sectional view of the main parts of the filtration apparatus 200, illustrating the process of removing the lower shaft 234b therefrom. FIG. 10 is a sectional view of the main parts of the filtration apparatus 200, illustrating the process of removing the cleansing tank 238 therefrom.

First, a description will be given with reference to FIG. 7. The motor 226 is removed from the base 228 as indicated by arrow A, by removing the bolts (not shown) that fix the motor 226 to the vase 228. At this time, the coupling 252 is prepared for separation, by removing a bolt (not shown) in advance.

Next, as illustrated in FIG. 8, the bolts 292 (refer to FIG. 6) that fix the base to the rim 224 are removed. Then, the base is suspended by a hook 346 engaging a rope or a wire 344, which is fed through eye bolts 342. The hook 346 is provided as part of a conveyance apparatus 340 (geared trolley), which is mounted on a rail 338 of the ceiling 336 of a building. At this time, the screw conveyor 232, which is held by the holding portion 236, is also drawn upward. However, the screw conveyor 232 cannot be completely extracted, due to the relationship between the length thereof and the height of the ceiling. Therefore, a temporary base 348 is mounted on the rim 224 after the screw conveyor 232 is drawn out to a predetermined height. The screw conveyor 232 is temporarily placed on the temporary base 348. The flange 294b of the separating portion 294 of the shaft 234 is placed on the temporary base 348.

The temporary base 348 is configured to be separable in the direction perpendicular to the axial direction of the shaft 234. When assembled, an opening 350 for receiving the shaft 234 is formed in the upper portion of the temporary base 348. The flange 294b is placed on the peripheral edge of the opening 350. It is preferable that the temporary base 348 is a cylindrical member. The cylindrical temporary base 348 is constituted of two parts, and is provided on the rim 224 from both sides of the shaft 234. The temporary base 348 may be constructed from a plurality of members having legs that abut the rim 224, as an alternative to the cylindrical construction.

After the base 228 is placed on the temporary base 348, the bolts 295 that link the separating portion 294, thereby separating the upper shaft 234a from the lower shaft 234b. In this manner, the base 228 and the upper shaft 234a are enabled to be moved horizontally in the direction indicated by arrow B, without lifting them any higher. At this time, the lower shaft 234b is left in a state in which it is supported by the temporary base 348.

Then, as illustrated in FIG. 9, the lower shaft 234b is lifted and removed from the cleansing tank 238 by the conveyance apparatus 340 or the like, at the same time that the temporary base 348 is removed from the rim 224.

Thereafter, as illustrated in FIG. 10, the bolts 282 that fix the cleansing tank 238 to the rim 224 are removed, and the cleansing tank 238 is extracted upward from the mounting opening 222.

In this manner, it is possible to sequentially remove each part from the mounting opening 222 of the filtration tank 202 when performing maintenance operations. This enables extremely efficient operations. Particularly, because the screw conveyor 232 is of a separable structure, the operations can be performed even indoors, with a relatively low ceiling. Note that the manner in which filtration and filtration media cleansing is performed is the same as those of the previous two embodiments.

As described above, in the third embodiment, the shaft 234 is of a separable structure, which yields good maintenance properties. Therefore, an advantageous effect is exhibited in that a cleansing tank 202 having good filtration efficiencies, by virtue of being long in the vertical direction, may be utilized even indoors, with a relatively low ceiling.

The preferred embodiments of the present invention have been described in detail above. However, the present invention is not limited to the configurations described above. For example, the lower ends 44 and 244 of the screw conveyors 32 and 232 are free ends. However, a configuration may be adopted wherein the lower ends 44 and 244 are supported. Specifically, the lower ends 44 and 244 maybe conical in shape, and a member having a recess for receiving the tip of the cone may be provided on the filtration floors 4 and 204. By this configuration, horizontal displacement of the screw conveyors 32 and 232 may be further suppressed. In addition, this configuration poses no obstacles to the replacement of the screw conveyors 32 and 232, and the cleansing tanks 38, 138, and 238.

In addition, the screw conveyors 32 and 232 are capable of conveying the filtration media 14 upward without necessarily protruding downward beyond the cleansing tanks 38, 138, and 238. In this case, the filtration media 14 is enabled to enter the cleansing tanks 38, 138, and 238 with relatively lower resistance by providing the lower ends 44 and 244 of the screw conveyors 32 and 232 above the filtration floors 4 and 204 at a distance.

It is preferable that the positions of the upper openings 42 are not too low. This is to enable scrubbing of the filtration media 14 over a longer distance within the cleansing tanks 38, 138, and 238. In addition, the manner of attachment between the cleansing tanks 38, 138, and 238 and the mounting openings are not limited to those of the embodiments described above. Various constructions may be considered that enable easy assembly and disassembly.

Note that in the above embodiments, cases in which water is filtered were described. However, the filtration apparatus of the present invention may be utilized to filter liquids other than water, such as oil.

Further, the cleansing portion includes the cleansing tanks 38, 138, and 238, the screw conveyors 32 and 232, and the drive mechanisms for the screw conveyors 32 and 232. However, the motors 26 and 226 are not necessarily included. In the case that the motors 26 and 226 are not included, they may be directly provided on the filtration tanks 2 and 202. In this case, the rotation of the motors is transferred to the screw conveyors via link portions. When the drive portions and the motors 26 and 226 are disassembled, the disassembly may be performed at the link portions.

Figure 11:
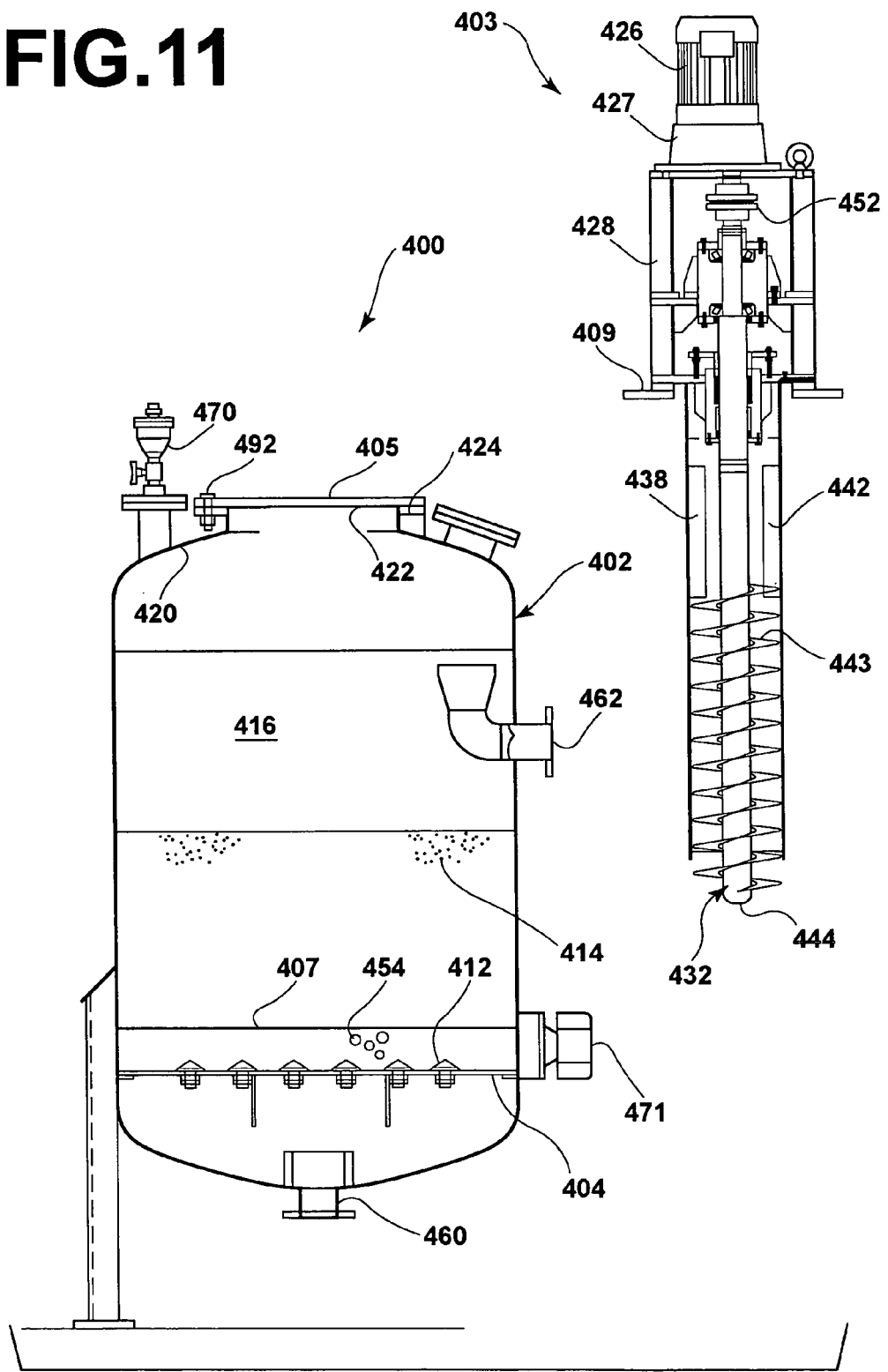
FIG. 11 is a sectional view of the main parts of a filtration apparatus according to a modification of the present invention.

Next, a modification of the present invention will be described with reference to FIG. 11. FIG. 11 is a sectional view of the main parts of a filtration apparatus 400 according to a modification of the present invention, in which a cleansing portion and a filtration tank are shown separately. The filtration apparatus 400 comprises a filtration tank 402, which is similar to the filtration tank 2. The filtration tank 402 comprises: a raw water filling opening 462; two filtration floors 404 and 407, which are separated in the vertical direction; strainers 412, which are provided on the lower filtration floor 404; a purified water discharge pipe 460 for discharging filtered water; and an air release valve 470. Two filtration floors are provided in the filtration apparatus 400. Filtration media 414 is housed above the upper filtration floor 407, and filtration media 454 is housed between the lower filtration floor 404 and the upper filtration floor 407.

A circular mounting opening 422 is formed at the center of the upper wall 420 of the filtration tank 402. A cleansing portion 403 (cleansing means), which is shown to the right of the filtration tank 402 separated therefrom, is mounted on the mounting opening 422. The peripheral edge of the mounting opening 422 is formed into a mounting rim 424. A discoid lid 405 is fixed on the rim 424 by a plurality of bolts 492, which are provided at predetermined intervals along the rim 424. In this manner, the mounting opening 422 is closed by the lid 405 during filtration. Accordingly, the filtration apparatus 400 does not comprise the cleansing portion 403 during filtration.

When the filtration apparatus 400 is utilized to filter water 416 (liquid), the filtration tank 402 is filled with the water 416 through the raw water filling opening 462. The raw water 416 is filtered by passing through the filtration media 414 and 454, then filtered water is discharged through the purified water discharge pipe 460.

Next, the cleansing portion 403 will be described. The cleansing portion 403 is of a similar construction to the cleansing portions of the filtration apparatuses 1, 100, and 200 illustrated in FIG. 1, FIG. 4, and FIG. 7. The cleansing portion 403 comprises: a motor 426 (drive portion); a brake mechanism 427 (drive portion) for decelerating the rotation of the motor 426; and a base 428 for supporting the motor 426 and the brake mechanism 427. A cylindrical cleansing tank 438 is mounted on the base 428. A screw conveyor 432, which is linked to the brake mechanism 427 via a coupling 452 and which is rotated by the motor 426, is provided within the cleansing tank 438. The base 428 of the cleansing portion 403 further comprises a flange 409 for mounting onto the rim 424. Apertures (not shown) are formed in the flange 409, at the same intervals as those of the bolts in the lid 405.

Next, a case in which the filtration media 414 and 454, which have contaminants trapped therein after a predetermined period of use, are cleansed, will be described. First, the lid 405 is removed, and the mounting opening 422 is exposed. Then, the cleansing tank 438 of the cleansing portion 403 is inserted through the mounting opening 422. The flange 409 of the cleansing portion 403 is placed on the rim 424 and bolted thereto, to fix the cleansing portion 403 to the filtration tank 402. Thereafter, the cleansing portion 403 is operated as in the previous embodiments, and the filtration media 414 is cleansed. Note that in FIG. 11, reference numeral 471 denotes an ultrasonic wave generating apparatus that separates contaminants from the filtration media 454 with ultrasonic vibrations.

The cleansing operation performed by the cleansing portion 403 is similar to those of the previous embodiments, and a rough description thereof is as follows. First, backwash of purified water is performed through the purified water discharge pipe 460 to cause the filtration media 414 to float, prior to driving the motor 426 that rotates the screw conveyor 432. Thereby, the load on the motor 426 during startup is reduced. When the motor 426 is driven, the screw conveyor 432 rotates. The filtration media 414 is conveyed upward to the interior of the cleansing tank 438, by a blade 443 of the rotating screw conveyor 432, particularly by the portion of the blade 443 that protrudes below the cleansing tank 438. The backwash of the purified water is continued during the initial stage of rotation of the screw conveyor 432. This is because mixing of the filtration media 414 at the radially outer and inner portions of the cleansing tank 438 is facilitated by rotating the screw conveyor 432 in the backwash cleansing state, due to centrifugal force of the screw conveyor 432. At the same time, the entirety of the filtration media 414 is thoroughly cleansed by this movement. The backwash of the purified water is ceased thereafter. However, the rotation of the screw conveyor 432 is continued for a short time thereafter, to perform cleansing.

The particles of the filtration media 414 are conveyed upward by the rotation of the screw conveyor 432 while rubbing against and scrubbing each other, and are discharged from upper openings 442 of the cleansing tank 438 into the filtration tank 402. Separation of contaminants from the filtration media 414 is enhanced by the impact of the filtration media 414 with the surface of the water 416. The filtration media 414 which has dropped back into the filtration tank 402 is conveyed upwards into the cleansing tank 438 repeatedly, and scrubbed therein. In this manner, contaminants are separated from the filtration media 414 by repetitive cleansing within the cleansing tank 438. At this time, contaminants within the filtration media 454 may be effectively removed by vibrations generated by the ultrasonic wave generating apparatus 471. As illustrated in FIG. 11, the lower end 444 of the screw conveyor 432 is positioned in the vicinity of the filtration floor 407. Therefore, the filtration media 414 close to the filtration floor 407 is conveyed upward as well, thereby thoroughly cleansing the entirety of the filtration media 414, in a similar manner as in the previous embodiments.

When cleansing is complete, purified water is backwashed through the purified water discharge pipe 460 again. The backwash cleansing is continued after rotation of the screw conveyor 432 is ceased. Contaminants, which have been separated from the filtration media 414, are caused to float by the backwash, and are expelled to the exterior through the raw water filling opening 462, along with water that contains contaminants. By continuing the backwash cleansing for a predetermined amount of time, all of the contaminants within the filtration tank 402 are removed.

When the cleansing and rinsing of the filtration media 414 and 454 are complete, the cleansing portion 403 is removed, the lid 405 is mounted on the rim 424, and the mounting opening 422 is closed. In this manner, the filtration apparatus 400, which does not comprise the cleansing portion 403, is suited for a manner of use in which cleansing is performed only during annual maintenance, for example. As the cleansing portion 403 is unnecessary at the time of initial installment, the filtration apparatus 400 may be provided at low cost.

The invention claimed is:

1. A filtration apparatus comprising a filtration tank for filtering a liquid which is introduced into filtration tank, and discharging the filtered liquid to an exterior of the filtration tank comprises:
   filtration media contained in the filtration tank;
   a filtration media cleansing mechanism that comprises a hollow cleansing tank for cleansing the filtration media, and a contaminant expulsion means for expelling contaminants separated from the filtration media to the exterior to the filtration tank; wherein:
   the cleansing tank is a cylindrical body that hangs within the filtration tank from an upper portion thereof,
   the cleansing tank is provided with a lower opening at a position lower that an upper surface of the filtration media housed in the filtration tank, and a plurality of upper openings at a position higher than the upper surface of the filtration media, and
   the cleansing tank is provided with a screw conveyor for conveying the filtration media and the liquid, which enter the cleansing tank from the filtration tank via the lower opening, upward from the lower opening to the upper openings while scrubbing the filtration media within the cleansing tank;
   a mounting opening, to which the upper portion of the cleansing tank is removably attachable, provided at the upper portion of the filtration tank; and
   a cleansing portion, comprising the cleansing tank, the screw conveyor, and a drive mechanism for the screw conveyor, removably attachable to the filtration tank via the mounting opening, from the exterior of the filtration tank.

2. A filtration apparatus as defined in claim 1, wherein:
   the lower end of the screw conveyor protrudes downward from the lower opening of the cleansing tank.

3. A filtration apparatus as defined in claim 2, wherein:
   the cleansing portion is constructed by a plurality of parts, which are detachably linked so as to separate in the axial direction of the screw conveyor.

4. A filtration apparatus as defined in claim 3, wherein:
   slots that enable the filtration media to pass therethrough are formed at the lower portion of the cleansing tank so that at least a portion of the slots are below the upper surface of the filtration media.

5. A filtration apparatus as defined in claim 4, wherein:
   a plurality of gaps that extend along the outer periphery of the axis of the screw conveyor are formed in the interior sides of the blades of the screw conveyor.

6. A filtration apparatus as defined in claim 3, wherein:
   a plurality of gaps that extend along the outer periphery of the axis of the screw conveyor are formed in the interior sides of the blades of the screw conveyor.

7. A filtration apparatus as defined in claim 2, wherein:
   slots that enable the filtration media to pass therethrough are formed at the lower portion of the cleansing tank so that at least a portion of the slots are below the upper surface of the filtration media.

8. A filtration apparatus as defined in claim 7, wherein:
   a plurality of gaps that extend along the outer periphery of the axis of the screw conveyor are formed in the interior sides of the blades of the screw conveyor.

9. A filtration apparatus as defined in claim 2, wherein:
   a plurality of gaps that extend along the outer periphery of the axis of the screw conveyor are formed in the interior sides of the blades of the screw conveyor.

10. A filtration apparatus as defined in claim 1, wherein:
    the cleansing portion is constructed by a plurality of parts, which are detachably linked so as to separate in the axial direction of the screw conveyor.

11. A filtration apparatus as defined in claim 10, wherein:
    slots that enable the filtration media to pass therethrough are formed at the lower portion of the cleansing tank so that at least a portion of the slots are below the upper surface of the filtration media.

12. A filtration apparatus as defined in claim 11, wherein:
    a plurality of gaps that extend along the outer periphery of the axis of the screw conveyor are formed in the interior sides of the blades of the screw conveyor.

13. A filtration apparatus as defined in claim 10, wherein:
    a plurality of gaps that extend along the outer periphery of the axis of the screw conveyor are formed in the interior sides of the blades of the screw conveyor.

14. A filtration apparatus as defined in claim 1, wherein:
    slots that enable the filtration media to pass therethrough are formed at the lower portion of the cleansing tank so that at least a portion of the slots are below the upper surface of the filtration media.

15. A filtration apparatus as defined in claim 14, wherein:
    a plurality of gaps that extend along the outer periphery of the axis of the screw conveyor are formed in the interior sides of the blades of the screw conveyor.

16. A filtration apparatus as defined in claim 1, wherein:
    a plurality of gaps that extend along the outer periphery of the axis of the screw conveyor are formed in the interior sides of the blades of the screw conveyor.

17. A filtration apparatus comprising a filtration tank containing filtration media for filtering a liquid which is introduced into the filtration tank, and discharging the filtered liquid to an exterior of the filtration tank, wherein the filtration tank comprises:
    a mounting opening that the filtration media is visible through provided in the filtration tank above the filtration media;
    a removably attachable lid provided to cover the mounting opening; and
    a cleansing portion having a hollow cleansing tank, a screw conveyor for conveying the filtration media and the liquid upward while scrubbing the filtration media within the cleansing tank, and a driving mechanism for driving the screw conveyor,
    wherein the cleansing portion is structured so that the lid is removed only when the filtration media is cleansed, and the cleansing portion is inserted into the mounting opening from outside for cleansing the filtration media.

* * * * *

UNITED STATES PATENT AND TRADEMARK OFFICE
CERTIFICATE OF CORRECTION

PATENT NO. : 7,267,767 B2  Page 1 of 1
APPLICATION NO. : 10/495917
DATED : September 11, 2007
INVENTOR(S) : Yasuhiro Saito It is certified that error appears in the above-identified patent and that said Letters Patent is hereby corrected as shown below:

In claim 1, column 17, line 3, "into filtration" should read --into the filtration--.

In claim 1, column 17, line 5, "tank comprises:" should read --tank, wherein the filtration tank comprises:--.

In claim 1, column 17, line 15, "that" should read --than--.

Signed and Sealed this

Twenty-seventh Day of November, 2007

JON W. DUDAS
*Director of the United States Patent and Trademark Office*